United States Patent
Henry et al.

(10) Patent No.: US 10,562,244 B2
(45) Date of Patent: Feb. 18, 2020

(54) SYSTEMS AND METHODS FOR FORMING A COMPOSITE PART BASED ON VOLUME

(71) Applicant: The Boeing Company, Chicago, IL (US)

(72) Inventors: Chelsey Elizibeth Henry, Sandy, UT (US); Jeremy Robert Larkin, West Jordan, UT (US); Kari P. Larkin, West Bountiful, UT (US); Hong Hue Tat, Seattle, WA (US); Yuan-Jye Wu, Seattle, WA (US)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 15/412,674

(22) Filed: Jan. 23, 2017

(65) Prior Publication Data
US 2018/0207891 A1    Jul. 26, 2018

(51) Int. Cl.
*B29C 70/54*      (2006.01)
*B29C 70/16*      (2006.01)
(Continued)

(52) U.S. Cl.
CPC ............ *B29C 70/541* (2013.01); *B29C 70/16* (2013.01); *B29C 70/44* (2013.01); *B29C 70/545* (2013.01);
(Continued)

(58) Field of Classification Search
None
See application file for complete search history.

(56) References Cited

U.S. PATENT DOCUMENTS

| 5,954,917 A | 9/1999 | Jackson et al. |
| 6,709,538 B2 | 3/2004 | George et al. |

(Continued)

FOREIGN PATENT DOCUMENTS

| WO | 2016186682 A1 | 11/2016 |
| WO | 2016199038 A1 | 12/2016 |
| WO | WO 2016/199038 | 12/2016 |

OTHER PUBLICATIONS

Buckingham et al. 'Automating the manufacture of composite broadgoods' Composites Part A, vol. 27A, pp. 191-200, Elsevier Science (1996).*

(Continued)

*Primary Examiner* — Bernard G Lindsay
(74) *Attorney, Agent, or Firm* — McDonnell Boehnen Hulbert & Berghoff LLP

(57) ABSTRACT

In an example, a method for forming a composite part includes, based on a part specification, cutting layers of material in a sequence and positioning the layers to form a stack. For each layer, after positioning the layer and before cutting a next layer in the sequence, the method includes (i) scanning along a length of the layer to determine an image, (ii) determining, based on the image, at least two edges of the layer, (iii) determining, based on the edges, a measured width at locations along the length of the layer, (iv) comparing the measured width at each location to a target width at the location, (v) deciding, based on the comparison, whether to adjust the production process, and (vi) if the decision is to adjust the production process, then adjusting the production process based on the comparison. The part specification specifies the target width at each location.

19 Claims, 13 Drawing Sheets

(51) Int. Cl.
  *B29C 70/44* (2006.01)
  *B29K 45/00* (2006.01)
  *B29K 63/00* (2006.01)
  *B29K 105/08* (2006.01)
  *B29K 105/00* (2006.01)

(52) U.S. Cl.
  CPC ........ *B29C 70/546* (2013.01); *B29K 2045/00* (2013.01); *B29K 2063/00* (2013.01); *B29K 2105/089* (2013.01); *B29K 2105/256* (2013.01)

(56) References Cited

U.S. PATENT DOCUMENTS

| | | | |
|---|---|---|---|
| 8,180,479 | B2 | 5/2012 | Xu et al. |
| 2010/0084087 | A1 | 4/2010 | McCowin et al. |
| 2014/0288893 | A1* | 9/2014 | Blom ................. G06F 17/5018 703/1 |
| 2015/0039123 | A1* | 2/2015 | Lindgren ............... B29C 73/10 700/191 |
| 2015/0217512 | A1 | 8/2015 | Lea et al. |
| 2016/0341671 | A1* | 11/2016 | Maass ................ G01N 21/8851 |
| 2017/0113422 | A1* | 4/2017 | Maass ................... B29C 70/384 |
| 2017/0161886 | A1* | 6/2017 | Shibayama ............ B24B 33/02 |
| 2018/0017499 | A1* | 1/2018 | Monchalin ......... G01N 21/8422 |

OTHER PUBLICATIONS

Li et al. 'Free-form surface inspection techniques state of the art review', Computer-Aided Design 36 (2004) pp. 1395-1417.*
Extended European Search Report prepared by the European Patent Office in application No. 17 196 303.6 dated Mar. 29, 2018.

* cited by examiner

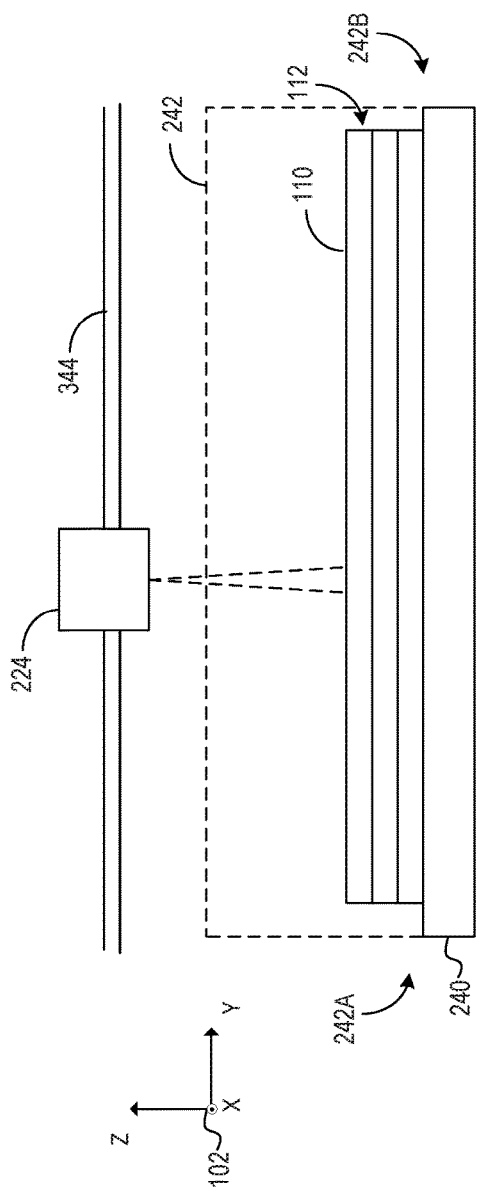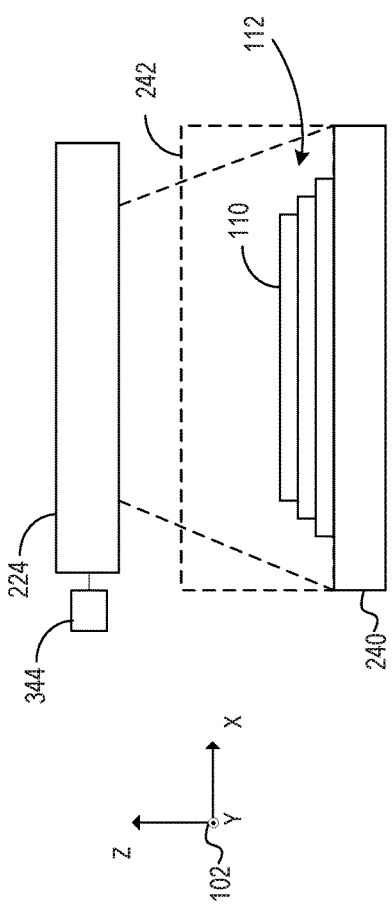

SYSTEMS AND METHODS FOR FORMING A COMPOSITE PART BASED ON VOLUME

FIELD

The present disclosure generally relates to composite parts, and more particularly to, systems and methods for forming a composite part.

BACKGROUND

Unless otherwise indicated herein, the materials described in this section are not prior art to the claims and are not admitted to be prior art by inclusion in this section.

With lightweight and high strength properties, composite materials are widely used to manufacture parts in a variety of industries. For example, the aerospace industry uses composite parts to make lightweight structural components of aircraft and spacecraft such as, for instance, fuselage frame structures, stringers, wings, horizontal stabilizers, and/or vertical stabilizers. One approach for forming a composite part includes cutting multiple layers of composite material, positioning the layers on a form having a desired shape, and then curing the layers while in the desired shape.

SUMMARY

A method and system for forming a composite part are disclosed. In an example, a method for forming a composite part includes cutting, based on a part specification, a plurality of layers of material in a sequence one layer at a time. The part specification specifies parameters for a production process for forming the composite part. The method also includes positioning, one layer at a time and based on the part specification, the plurality of layers to form a stack in a measurement region of a layup device. For each layer, after positioning the layer and before cutting a next layer in the sequence, the method includes (i) scanning along a length of the layer to determine an image of the layer, (ii) determining, based on the image, at least two edges of the layer, (iii) determining, based on the at least two edges, a measured width at a plurality of locations along the length of the layer, (iv) performing a comparison of the measured width of the layer at each location to a target width at the location, (v) deciding, based on the comparison, whether to adjust the production process, and (vi) if the decision is to adjust the production process, then adjusting the production process based on the comparison of the measured width to the target width at each location. The parameters specified by the part specification include the target width at each location along the length of layer. Also, for at least one layer, the decision is to adjust the production process.

In another example, a system for forming a composite part includes a cutting device to cut, one layer at a time, a plurality of layers of material, a measurement region to receive the plurality of layers, one layer at a time, to form a stack, and a measurement device to scan the measurement region. The system also includes a controller configured to cause the cutting device to cut, based on a part specification, the plurality of layers one layer at a time in a sequence. The part specification specifies parameters for a production process for forming the composite part. For each layer, after receiving the layer in the measurement region and before causing the cutting device to cut a next layer in the sequence, the controller is further configured to: (i) cause the measurement device to scan along a length of the layer to determine an image of the layer, (ii) determine, based on the image, at least two edges of the layer, (iii) determine, based on the at least two edges, a measured width at a plurality of locations along the length of the layer, (iv) perform a comparison of the measured width of the layer at each location to a target width at the location, (v) decide, based on the comparison, whether to adjust the production process, and (vi) if the decision is to adjust the production process, then adjust, based on the comparison, at least one parameter of the part specification for cutting the next layer in the sequence. The parameters specified by the part specification include the target width at each location along the length of layer. For at least one layer, the decision is to adjust the production process.

In another example, disclosed is a non-transitory computer-readable medium having stored thereon, program instructions that when executed by a controller, cause a composite part production system to perform a set of acts. The composite part production system includes a cutting device for cutting a plurality of layers of material, a measurement region for receiving the plurality of layers to form a stack, and a measurement device for scanning the measurement region. The set of acts include cutting, by the cutting device and based on a part specification, a plurality of layers one layer at a time in a sequence. The part specification specifies parameters for a production process for forming the composite part. The set of acts also include positioning, one layer at a time and based on the part specification, the plurality of layers to form the stack in the measurement region. For each layer, after positioning the layer and before cutting a next layer in the sequence, the set of acts further include: (i) scanning, by the measurement device, along a length of the layer to determine an image of the layer, (ii) determining, based on the image, at least two edges of the layer, (iii) determining, based on the at least two edges, a measured width at a plurality of locations along the length of the layer, (iv) performing a comparison of the measured width of the layer at each location to a target width at the location, (v) deciding, based on the comparison, whether to adjust the production process, and (vi) if the decision is to adjust the production process, then adjusting, based on the comparison, at least one parameter of the part specification for cutting the next layer in the sequence. The parameters specified by the part specification include the target width at each location along the length of layer. For at least one layer, the decision is to adjust the production process.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

FIG. 3A depicts a side view of a measurement device for scanning a measurement region of a layup device according to an example embodiment.

FIG. 3B depicts another side view of the measurement device for scanning the measurement region of the layup device in FIG. 3A.

DETAILED DESCRIPTION

I. Overview

Figure 1:
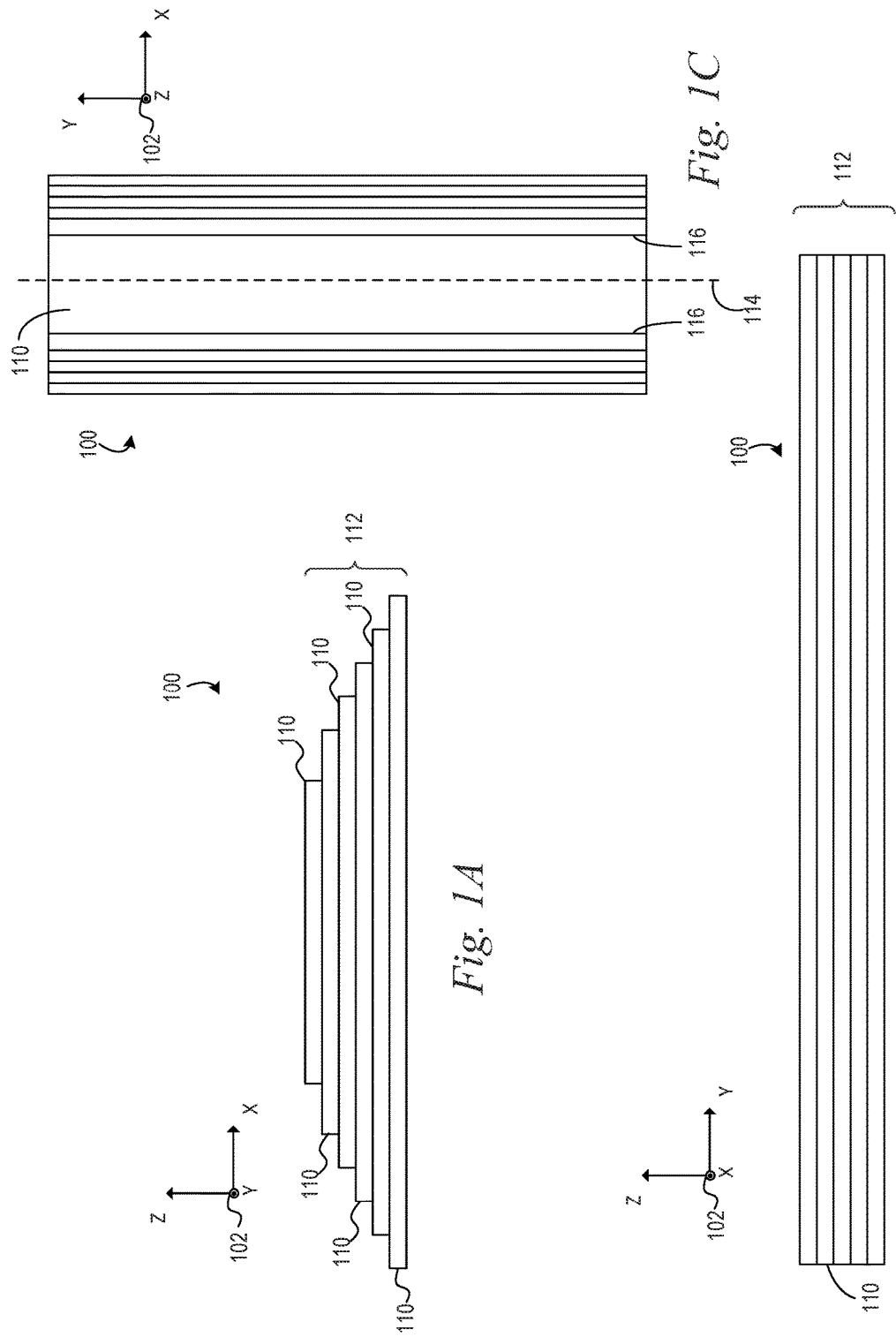
FIG. 1A depicts a side view of a composite part according to an example embodiment.
FIG. 1B depicts another side view of the composite part of FIG. 1A.
FIG. 1C depicts a top view of the composite part of FIG. 1A.

The systems and methods of the present disclosure provide manufacturing systems and methods for forming a composite part. In general, the composite part can be formed by cutting a plurality of layers of uncured composite material, positioning the layers on each other to form a stack, and curing the stack. Operation of a system can be controlled based on a part specification, which specifies parameters for the production process. For example, the part specification can specify parameters that provide a quantity of layers to be cut and target dimensions for each layer. Using these parameters, a cutting device can cut each layer to a desired shape and size. As another example, the part specification can specify parameters providing a sequence for cutting the layers and positioning the layers on the stack, and/or parameters providing a position of the layers relative to each other in the stack. Using the part specification, the system can thus carry out a production process for forming the composite part according to a desired design provided by the part specification.

During the production process, one or more of the layers may not be produced exactly as specified by the part specification. For example, the processes for cutting and/or positioning the layers may have inherent statistical variability, which causes a composite part to be produced with one or more variances and/or errors relative to the part specification. Depending on the end use of the composite part and/or the industry, relatively small variances may be acceptable whereas relatively large variances may result in rejection of the composite part.

In the aerospace industry, for example, quality assurance requirements may relate to dimensional characteristics of the composite part. In some instances, an inspector may spot-check an individual layer (e.g., using calipers) at a few locations to estimate whether the dimensional characteristics of the layer deviate from the part specification by more than an allowable engineering tolerance. While the inspector evaluates the layer, the production process may be halted thereby introducing relatively long delays to the production process. If the inspector determines that a dimensional characteristic of the layer does not meet the allowable engineering tolerance (i.e., the inspector identifies an out-of-tolerance condition), the entire composite part may be rejected and discarded.

Additionally, the inspector may perform a final check of the composite part once the production process is complete. For example, the inspector may estimate a final volume of the composite part and determine whether the final volume is within allowable engineering tolerances of the part specification. In some instances, the inspector may not identify out-of-tolerance conditions during the inspection of individual layers, but the inspector may identify an out-of-tolerance condition for the final composite part. This may occur when small variances in individual layers accumulate to collectively cause the final part to be out-of-tolerance. Alternatively, because the inspector may only spot-check the individual layers at a few locations, the inspector may miss an out-of-tolerance condition for one or more layers.

Existing systems and methods for forming a composite part are thus susceptible to delays and/or wasted materials due to inspection processes, out-of-tolerance conditions, and/or rejections of formed composite parts. The systems and methods for forming a composite part provided by the present disclosure can beneficially help to mitigate these drawbacks of existing systems and methods. In particular, the systems and methods of the present disclosure can reduce (or eliminate) delays and waste by evaluating the layers on a layer-by-layer basis to identify out-of-tolerance conditions during the production process and, if an out-of-tolerance condition is identified, dynamically adjusting one or more subsequent steps in the production process to mitigate the out-of-tolerance condition.

Within examples, after cutting each layer, a measurement device can scan along a length of the layer to determine an image of the layer. A controller can determine edges of the layer based on the image and dimensions of the layer based on the edges. The determined dimensions can include, for example, a measured width at multiple locations along the length of the layer, a centerline along the length of the layer, a measured surface area of the layer, and/or a measured volume of the layer. The controller can compare the determined dimensions to corresponding target dimensions for the layer, which are provided by the part specification. If it is determined, based on the comparison, that an out-of-tolerance condition exists (or will likely exist during subsequent steps in the process), then the production process is adjusted.

In one example, adjusting the production process includes adjusting one or more parameters in the part specification, which are used to cut a subsequent layer. For instance, if a measured width of a layer is determined to be too narrow, the production process can be adjusted to cut a subsequent layer with an increased width. Similarly, if a measured width of a layer is determined to be too wide, the production process can be adjusted to cut a subsequent layer with a decreased width. In additional or alternative examples, adjusting the production process includes adding additional material to a layer in the stack, re-positioning a layer on the stack, and/or removing and cutting a replacement layer. Within examples, the system can advantageously implement these dynamic adjustments to the production process to respond to out-of-tolerance conditions without interruption, thereby enhancing manufacturing efficiency.

II. Example Composite Parts

FIGS. 1A-1C depict a composite part 100 according to an example. In particular, FIG. 1A depicts a plan view of a side of the composite part 100 in an X-Z plane of a coordinate system 102, FIG. 1B depicts a plan view of a side of the composite part 100 in a Y-Z plane of the coordinate system 102, and FIG. 1C depicts a top view of the composite part in a X-Y plane of the coordinate system 102. To more clearly depict aspects of the composite part, FIGS. 1A-1C are not to scale relative to each other.

As shown in FIGS. 1A-1C, the composite part 100 includes a plurality of layers 110 of composite material arranged in a stack 112. Example composite material that can be used includes a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on, for example, a degree of reinforcement desired. The layers 110 can be any suitable dimension to provide various degrees of reinforcement, and the composite part 100 can include any quantity of layers of prepreg tape or fabric.

The layers 110 are laid on top of each other, and lined up to a predetermined dimension and/or predetermined orientation. A quantity of layers 110 to be stacked may depend on a final design geometry of the composite part 100, and thus, the composite part 100 can be assembled to have a desired thickness in a predetermined orientation. As shown in FIG. 1C, the layers 110 in the illustrated example are positioned in the stack 112 such that the layers 110 are aligned about a common centerline 114, which extends along a length of the layers 110 at a midpoint between two edges 116 of the layers 110. Aligning the layers 110 about a common centerline 114 can beneficially facilitate achieving certain part geometry designs of the part specification in some examples.

As shown in FIGS. 1A-1C, each layer 110 has a length extending in a direction parallel to the Y-axis of the coordinate system 102, a width extending in a direction parallel to the X-axis of the coordinate system 102, and a height extending in a direction parallel to the Z-axis of the coordinate system 102. In the illustrated example, the layers 110 generally have the same lengths and heights, but have different widths. Also, in the illustrated example, the layers 110 are generally rectangular and the layers 110 decrease in width from a bottommost layer in the stack 112 to a topmost layer in the stack 112. In additional or alternative examples, the layers 110 can have different shapes, sizes, and/or orientations than those depicted in FIGS. 1A-1C.

III. Example Systems

Figure 2:
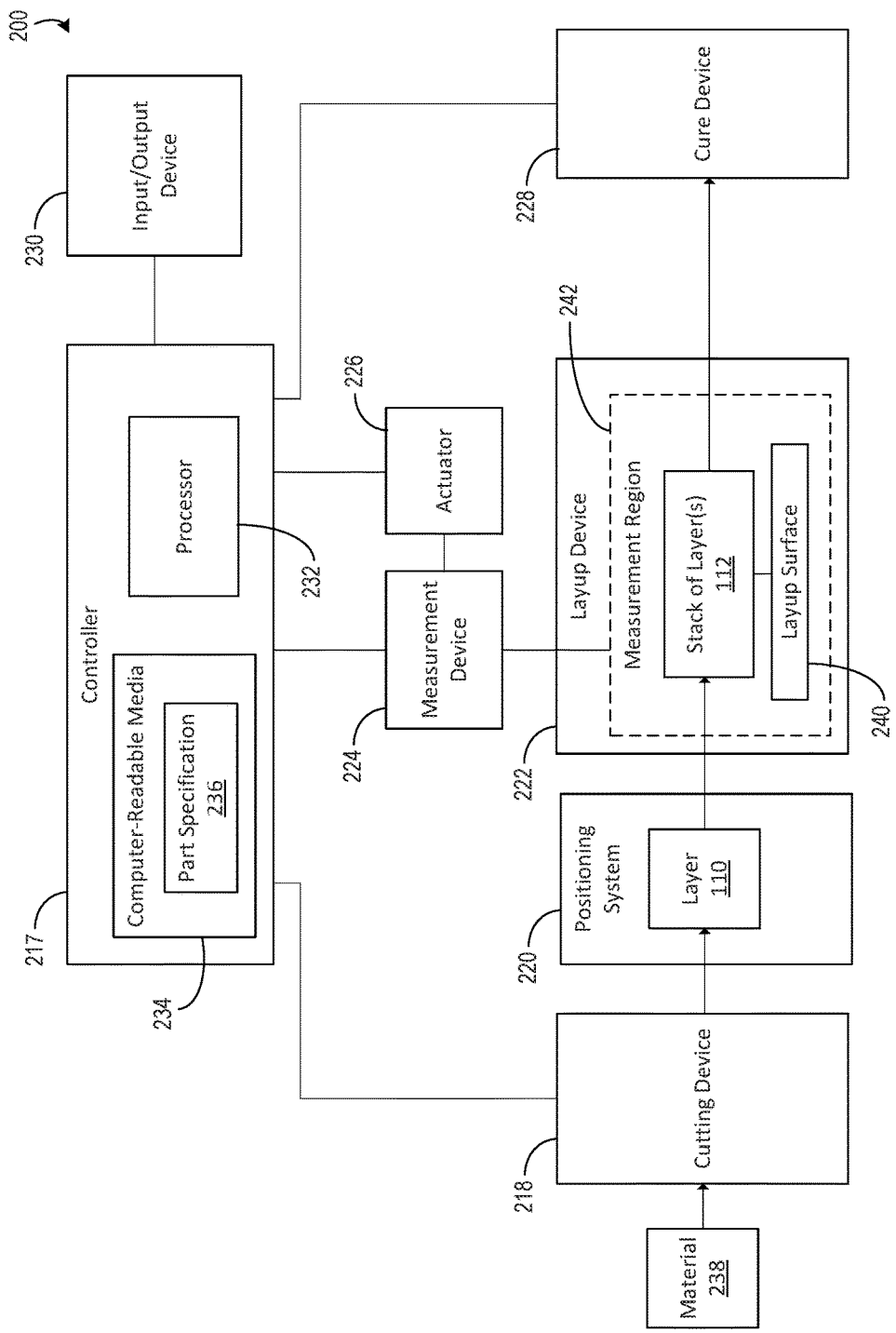
FIG. 2 depicts a simplified block diagram of a system for forming a composite part according to an example embodiment.

FIG. 2 depicts a simplified diagram of a system 200 for forming the composite part 100 according to an example. As shown in FIG. 2, the system 200 can include a controller 217, a cutting device 218, a positioning device 220, a layup device 222, a measurement device 224, an actuator 226, a curing device 228, and an input/output device 230. These components of the system 200 can be connected in any manner, including wired or wireless connections. Further, in some examples, components of the system 200 shown as a single entity can be distributed among multiple physical entities, and components shown as multiple entities can be embodied as a single physical entity.

The controller 217 can be implemented using hardware, software, and/or firmware. For example, the controller 217 can include one or more processors 232 and a non-transitory computer readable medium 234 (e.g., volatile and/or non-volatile memory) that stores machine language instructions or other executable instructions. The instructions, when executed by the one or more processors, cause controller 217 to carry out the various operations of the system 200 described herein.

As shown in FIG. 2, the computer readable media 234 stores a part specification 236, which specifies a plurality of parameters relating to a production process for forming the composite part 100. As examples, the part specification 236 can include parameters relating to a quantity of layers 110 for the composite part 100, one or more target dimensions of each layer 110, a sequence for cutting the layers 110, a sequence for positioning the layers 110 on the layup device 222, a target position of each layer 110 in the stack 112, and/or a target volume of the stack 112 at each step in the production process. In one implementation, the target dimensions of each layer 110 include a target width at each location of a plurality of locations along the length of the layer 110. As additional or alternative examples, the parameters can relate to engineering tolerances, which can provide threshold values or amounts for determining whether to adjust the production process as described in further detail below. The parameters of the part specification 236 can further include computer-readable instructions that, when executed by the controller 217, control operation of the components of the system 200 to carry out a production process for forming the composite part 100.

In an example, the controller 217 can determine the part specification 236 based, at least in part, on computer-implemented software that receives input relating to the design of the composite part 100 and generates the parameters for the system 200 from the input. For example, the software can include computer-aided design (CAD) software tools to specify design aspects of the composite part

100, including design aspects relating to one or more of the example parameters described above.

The cutting device 218 is operable to cut a material 238 into a plurality of layers 110, one layer at a time. In an example, the cutting device 218 includes a cutting tool that can move along one or more machine axes to follow a programmed cutting path, which is based on the part specification 236. For instance, one or more parameters of the part specification 236 can provide coordinates corresponding to target edges of the layer 110 and the cutting tool can move along the cutting path including the coordinates. The coordinates for guiding the cutting device 218 can be based on the parameters of the part specification 236 specifying the target width at each location of a plurality of locations along the length of each layer 110. As such, the cutting device 218 cuts a layer 110 to target dimensions specified by parameters of the part specification 236 for the layer 110.

In an example, the cutting device 218 can include a computer numerical control (CNC) machine with one or more ultrasonic cutter(s) each having a cutting knife driven by an ultrasonic transducer. The ultrasonic cutter(s) can be coupled to a tool head that can move along one or more machine axes to follow the programmed cutting path, which is based on the part specification 236. As additional or alternative examples, the cutting device 218 can include one or more bandsaws, routers, saber saws, die grinders, and/or cut-off wheels to cut each layer 110 from the material 238.

The layup device 222 has a layup surface 240 on which the layers 110 are positioned to form a stack 112. The layup device 222 also has a measurement region 242, which includes a volume of free space extending from the layup surface 240 toward the measurement device 224 (as shown in FIGS. 3A-3B described in further detail below). As such, the layup device 222 receives the layers 110, one layer at a time, in the measurement region 242 when the layers 110 are positioned to form the stack 112 on the layup surface 240.

As shown in FIG. 2, the system 200 can include a positioning device 220 that facilitates positioning the layers 110 in the measurement region 242 of the layup device 222. For example, in an implementation in which the cutting device 218 is at a first station and the layup device 222 is at a second station, the positioning device 220 can include a transport device for moving the layers 110, one layer at a time, from the cutting device 218 to the layup device 222. For instance, the positioning device 220 can include one or more spools for kitting each layer 110 from the cutting device 218 to the layup device 222.

As another example, the positioning device 220 can include one or more robots having end-effectors that can physically manipulate each layer 110 to position the layer 110 relative to each other in the measurement region 242. The robots may be controlled based on the part specification 236. For instance, the parameters of the part specification 236 can specify coordinates on the layup device 222 for a target position of each layer 110, and the robot(s) may move the layer 110 to the target location.

As a further example, the positioning device 220 can include a physical template and/or a light projected template for facilitating a manual hand layup of the layers 110 on the layup surface 240. The operation of the template(s) also can be based on the part specification 236. For instance, the light projected template can project a light pattern, indicating a position of each layer 110, on the layup surface 240 based on coordinates for the light pattern provided by parameters of the part specification 236.

In an additional or alternative example, the positioning device 220 can be combined with the cutting device 218. For instance, in some examples, the cutting device 218 can cut each layer 110 and position the layer 110 on the layup device 222 substantially simultaneously. In one implementation, the material 238 is placed on the stack 112, the cutting device 218 then cuts the next layer 110 from the material in-situ on the stack 112, and any excess material 238 is removed. In another implementation, the cutting device 218 can dispense the material 238, cut the layer 110 from the material 238, and position the layer 110 in a single continuous operation.

The measurement device 224 is operable to scan the measurement region 242 to determine an image of the layer(s) 110 on the layup surface 240. Within examples, the measurement device 224 can include a displacement sensor (e.g., a laser displacement sensor and/or an ultrasonic displacement sensor) that can measure, at a plurality of points in the measurement region 242, a distance between (i) the measurement device 224 and (ii) the layer(s) 110 in the measurement region 242 and/or the layup surface 240. The respective distance measured at each point in the measurement region 242 corresponds to a respective height measurement at the point. The height measurements obtained by the measurement device 224 can be spatially mapped to the respective points in the measurement region 242 to determine the image of the layer(s) 110 in the measurement region 242.

To facilitate scanning the measurement device 224 over the points in the measurement region 242, the actuator 226 is operable to move the measurement device 224 relative to the measurement region 242. Within examples, the actuator 226 can include one or more mechanical actuators, hydraulic actuators, pneumatic actuators, and/or electro-mechanical actuators for moving the measurement device 224. In one example, the actuator 226 can include a linear actuator that is operable to move the measurement device 224 in a single dimension along a length of the layer(s) 110 in the measurement region 242. In another example, the actuator 226 is operable to move the measurement device 224 in multiple dimensions. Moving the measurement device 224 in multiple dimensions may be beneficial, for instance, in implementations in which the measurement device 224 needs to be moved to scan over the entire width of the layer(s) 110 and/or the measurement region 242.

In general, the actuator 226 is operable to move the measurement device 224 to allow the measurement device 224 to obtain a distance and/or a height measurement at the plurality of points in the measurement region 242. As an example, the actuator 226 is operable to facilitate the measurement device 224 obtaining a measurement every approximately 0.1 millimeters (i.e., approximately 0.0039 inches) across the width of the measurement region 242 and every approximately 4 millimeters (i.e., approximately 0.1575 inches) along the length of measurement region 242. Thus, for a layer 110 that is approximately 60 millimeters (i.e., approximately 2.3622 inches) wide and approximately 185 millimeters (i.e., approximately 7.2834 inches) long, the measurement device 224 measures a respective distance at approximately 27750 points in the measurement region 242.

FIGS. 3A-3B depict side views of the measurement device 224 scanning three of the layers 110 in the measurement region 242 according to an example. In FIGS. 3A-3B, each layer 110 has a length that extends in a direction parallel to the Y-axis of the coordinate system 102, a width that extends in a direction parallel to the X-axis of the coordinate system 102, and a height that extends in a direction parallel to the Z-axis of the coordinate system 102.

To more clearly depict aspects of these features, FIGS. 3A-3B are not to scale relative to each other.

As shown in FIGS. 3A-3B, the layers 110 are arranged in the stack 112 on the layup surface 240, which is a flat surface extending in a first plane of the measurement region 242 (e.g., a plane parallel to the X-Y plane of the coordinate system 102). As also shown in FIGS. 3A-3B, the measurement device 224 can move along a track 344 above the layup surface 240 from a first end 242A of the measurement region 242 to a second end 242B of the measurement region 242. The track 344 thus guides movement of the measurement device 224 in a second plane, which is parallel to and at a fixed distance above the first plane. This allows the measurement device 224 to scan along the length of the layers 110 in a top-down manner.

Referring back to FIG. 2, the curing device 228 is operable to cure the stack 112. For example, the curing device 228 can include an autoclave and/or a vacuum bagging system for applying heat and/or pressure to the layers 110 of the stack 112.

The input/output unit 230 includes one more devices configured to receive inputs from and/or provide outputs to a user. For example, the input/output unit 230 can include a display that is configured to output information to the user. In one implementation, the display is a touchscreen configured to output information to the user and receive user input. The input/output unit 230 can additionally and/or alternatively include one or more buttons, switches, levers, microphones, etc. configured to receive user inputs and/or one or more speakers, indicator lights, etc. configured to present visual/auditory outputs to the user. As described above, the input/output unit 230 is communicatively coupled to the controller 217 for receiving the inputs from the user and/or providing the outputs to the user.

Within examples, the system 200 can be configured to operate autonomously and/or semi-autonomously. Further, the system 200 is shown in FIG. 2 for illustrative purposes according to one example, and may include more or fewer components in additional or alternative examples.

IV. Example Operations

In operation, the system 200 carries out a production process including a sequence of operations for forming a composite part 100. Within examples, the production process includes (i) cutting, by the cutting device 218 based on the part specification 236, a plurality of layers 110 of material in a sequence one layer at a time, (ii) positioning, one layer at a time and based on the part specification 236, the layers to form the stack 112 in the measurement region 242 of the layup device 222, (iii) after positioning each layer 110, evaluating the layer 110 to decide whether to adjust the production process before cutting a next layer in the sequence, and (iv) if the decision is to adjust the production process, then determining and implementing an adjustment to the production process based on the evaluation.

To cut the layers, the cutting device 218 first receives the material 238 from a material supply. The cutting device 218 then cuts, based on the part specification 236, the layers 110 of material 238 in a sequence one layer at a time. As described above, operation of the cutting device 218 can be controlled based on the parameters of the part specification 236. For example, the cutting device 218 can cut a programmed quantity of layers in a programmed sequence to programmed dimensions based on the parameters of the part specification 236.

In one implementation, the cutting device 218 can cut each layer 110 by moving along a programmed cutting path based on coordinates specified by the parameters of the part specification 236 for the layer 110. The coordinates provided by the part specification 236 can thus facilitate cutting each layer 110 according to one or more target widths at a plurality of locations along the length of the layer 110. In one implementation, the coordinates can represent turning points at which changes to the target width of the layer 110 are desired.

The layers 110 are positioned, one layer at a time and based on the part specification 236, to form the stack 112 in the measurement region 242 of the layup device 222. For example, the positioning device 220 can position the layers 110 relative to each other based on coordinates specified by the parameters of the part specification 236. The coordinates can represent target positions for the layers 110. In one implementation, the target positions of the layers 110 are configured to align the centerline 114 of each layer 110 with the centerline 114 of the other layers 110 in the stack 112.

As described above, positioning the layers 110 based on the part specification 236 can additionally or alternatively include positioning the layers 110, one layer at a time, according to the sequence of the layers 110 specified by the part specification 236. Within examples, a first layer 110 in the sequence is positioned on the layup surface 240 to begin forming the stack 112, and each subsequent layer 110 in the sequence is then positioned on top of the preceding layer 110 in the sequence.

To evaluate each layer 110 after the layer 110 is positioned in the measurement region 242 and before cutting a next layer in the sequence, the measurement device 224 scans along the length of the layer 110 to determine an image of the layer 110. In an example, while scanning along the length of the layer 110, the measurement device 224 measures a height at a plurality of points in the measurement region 242. The measurement device 224 and/or the controller 217 can then spatially map the measured height at each point to the measurement region 242 to form the image. In one implementation, the controller 217 also generates a graphical representation of the image by coding a plurality of grayscale values to the different height measurements. The input/output device 230 can output the graphical representation to an operator.

Based on the image, the controller 217 determines at least two edges 116 of the layer 110. For example, the controller 217 can determine a first set of the plurality of points in the measurement region 242 and a second set of the plurality of points in the measurement region at which the measured height changes by greater than a threshold amount. The threshold amount can be based on, for example, a thickness of the layer 110.

Figure 4A:
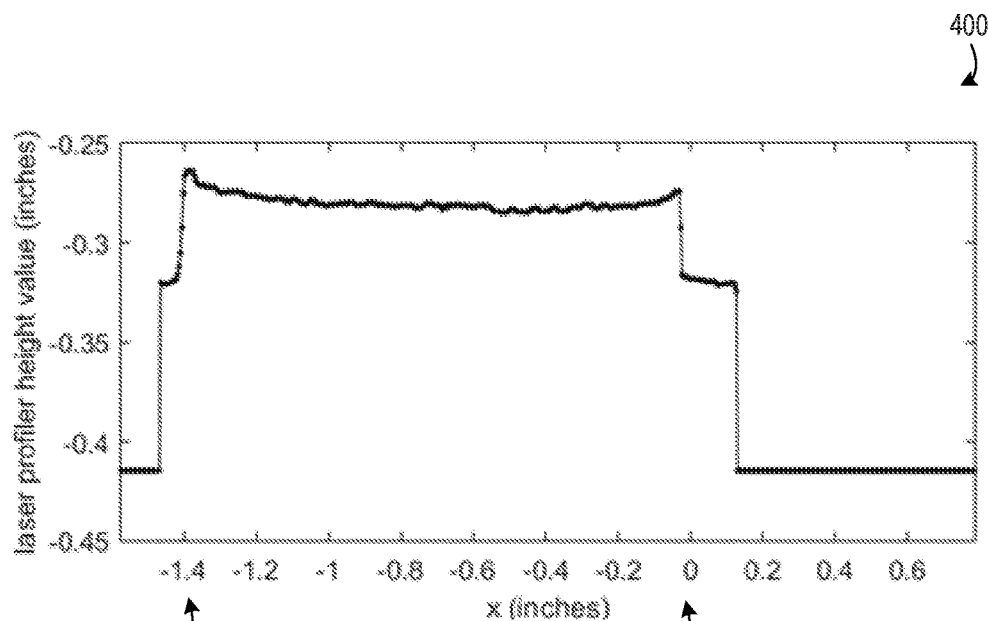
FIG. 4A depicts a graph plotting a measured height across a width of a layer, according to an example embodiment.
Figure 4B:
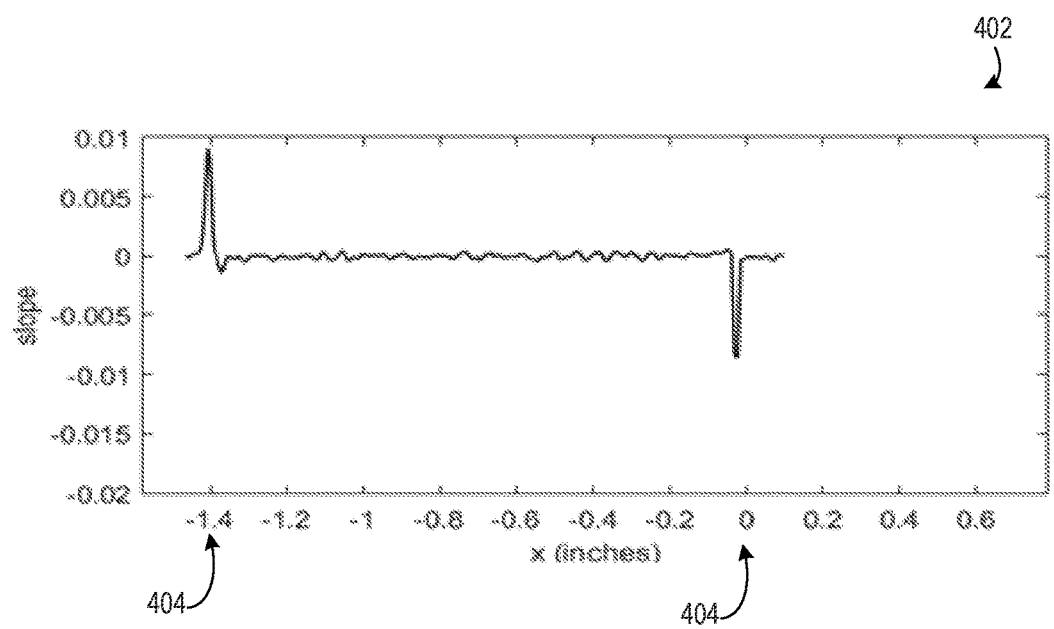
FIG. 4B depicts a graph of a slope of plot line depicted in FIG. 4A.

FIG. 4A depicts a graph 400 of the heights measured at the points in the measurement region 242 for a single location along the length of the layer 110 according to an example, and FIG. 4B depicts a graph 402 of a slope of the plot shown in FIG. 4A. As shown in FIGS. 4A-4B, the edges 116 of a layer 110 are indicated by the points 404 at which the measured height and, thus, the slope changes by greater than the threshold amount. As one example, the threshold amount can be a change of the slope by approximately 0.0025 in the illustrated example of FIG. 4B.

Based on the at least two edges 116, the controller 217 determines a measured width at each of the locations along the length of the layer 110. For example, the controller 217 can determine the measured width at each location by determining a distance between the point in the first set and the point in the second set corresponding to the edges 116 of the layer 110 at the location.

The controller 217 then performs a comparison of the measured width of the layer 110 at each location to a target width at the location, which is specified by the parameters of the part specification 236. The controller 217 next decides, based on the comparison, whether to adjust the production process before cutting the next layer in the sequence. For example, the controller 217 can perform the comparison by determining a difference between the measured width and the target width at each location and then determine whether the difference is greater than a threshold amount. If the difference between the measured width and the target width for at least one location is greater than the threshold amount, the controller 217 can decide to adjust the production process. In one example, the threshold amount for the difference between the measured width and the target width can be approximately 0.03 inches (i.e., approximately 0.762 millimeters).

As another example, the controller 217 can perform the comparison by determining a difference between a location of a transition in the measured widths relative to the location of a transition for the target widths. For instance, in some implementations, the part specification 236 can specify target widths that change over the length the layer 110. A location at which the target width changes may be referred to as a width transition location. In such implementations, the controller 217 can determine, based on the measured widths, one or more width transition locations and determine a difference between the width transition location(s) of the measured widths and corresponding width transition location(s) of the target widths. If the difference between the width transition locations of the measured and target widths is greater than a threshold amount, the controller 217 can decide to adjust the production process. In one example, the threshold amount for the difference in width transition locations of the measured and target widths can be approximately 0.1 inches (i.e., approximately 2.54 millimeters).

Figure 5A:
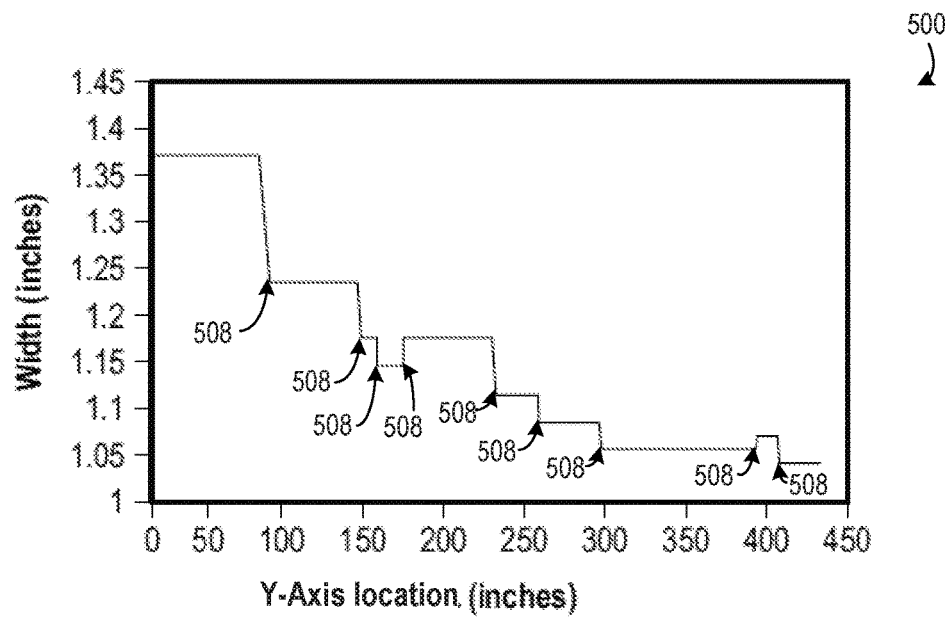
FIG. 5A depicts a graph of a target width along a length of a layer, according to an example embodiment.
Figure 5B:
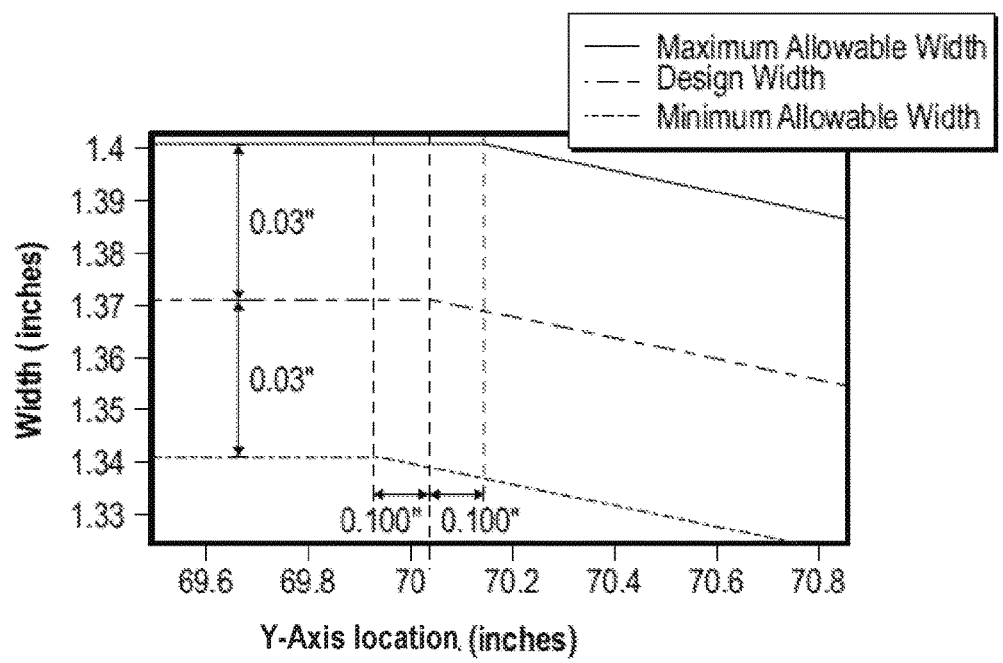
FIG. 5B depicts an enlarged portion of the graph of FIG. 5A.

FIG. 5A depicts a graph 500 of the target widths at a plurality of locations along the length of one layer 110 according to an example. As shown in FIG. 5A, the target widths can change at a plurality of width transition locations 508 in this example. FIG. 5B depicts an enlarged view of a portion of the graph 500 shown in FIG. 5A at an example transition location. Additionally, FIG. 5B depicts the target width based on the part specification 236, a maximum allowable width of the layer based on a threshold amount for the difference between the measured width and the target width, and a minimum allowable width based on the threshold amount. In the example of FIG. 5B, the threshold amount is 0.03 inches. FIG. 5B further depicts a maximum allowable width transition location and a minimum allowable width transition location based on the target width and a threshold amount of 0.1 inches for the difference in width transition locations.

If the controller 217 decides to adjust the production process, then the production process is adjusted based on the comparison of the measured width to the target width at each location. In one example, the controller 217 adjusts the production process by adjusting, based on the difference between the measured width and the target width at each location, at least one parameter of the part specification 236 for cutting the next layer. For instance, if the measured width of a layer 110 is less than the target width at a first location, the controller 217 can adjust the parameter(s) of the part specification 236 by increasing the target width at the first location for the next layer in the part specification 236. Similarly, if the measured width of a layer 110 is greater than the target width at the first location, the controller 217 can adjust the parameter(s) of the part specification 236 by decreasing the target width at the first location for the next layer in the part specification 236. Thus, when the production process proceeds with cutting the next layer 110, the cutting device 218 will be programmed to follow an adjusted cutting path through the material to mitigate the out-of-tolerance condition identified during the evaluation of the layer 110.

In additional or alternative examples, the controller 217 can adjust the parameter(s) of the part specification 236 by increasing and/or decreasing the target width for more than one of the remaining layers 110 in the stack 112. For example, the controller 217 can adjust the parameter(s) of the part specification 236 by increasing and/or decreasing the target width for the next two layers 110, the next three layers 110, the next four layers 110, etc. in the stack 112. This can provide for mitigating an out-of-tolerance condition by smaller adjustments to multiple layers 110 instead of a comparatively large adjustment to a single layer 110.

In additional or alternative examples, adjusting the production process includes adding additional material to a layer 110 in the stack 112. For instance, the controller 217 can determine, based on the difference between the measured width and the target width at a location, an amount of the material to add to the layer 110 at the location. The determined amount of composite material is then added to the layer 110 at the location to mitigate the out-of-tolerance condition.

In additional or alternative examples, adjusting the production process includes removing and cutting a replacement layer 110 before cutting the next layer in the sequence. By adjusting the production process based on the evaluation of the layer 110 before cutting a next layer in the sequence, the system 200 can advantageously implement these dynamic adjustments to the production process to respond to out-of-tolerance conditions without interruption, thereby enhancing manufacturing efficiency.

Within examples, the controller 217 additionally or alternatively evaluates the layer 110 by determining, based on the at least two edges 116, a centerline 114 of the layer and comparing the centerline 114 to a reference centerline. For example, the controller 217 can determine a centerline 114 by determining a set of the points in the measurement region 242 that are equally spaced between the edges 116 of the layer 110 along the length of the layer 110. The reference centerline line can be a centerline 114 of the first layer in the sequence. The controller 217 can compare the centerline 114 of the layer 110 to the reference centerline by determining a difference between the centerline 114 of the layer 110 and the reference centerline, and determining whether the difference is greater than a threshold amount.

In one example, if the controller 217 determines that the difference is greater than the threshold amount, then the layer 110 is repositioned on the stack 112 to reduce the difference between the centerline 114 of the layer 110 and the reference centerline. In another example, if the controller 217 determines that the difference is greater than the threshold amount, then the layer 110 is removed from the stack 112 and re-cut to reduce the difference between the centerline 114 of the layer 110 and the reference centerline.

Also, within examples, the controller 217 additionally or alternatively evaluates the layer 110 by determining, based on the at least two edges 116, a surface area of the layer. Based on the determined surface area of the layer 110 and a known thickness of the layer 110, the controller 217 can determine a volume of the stack 112 that exists in the measurement region 242 after the layer 110 is positioned.

The controller 217 then compares the measured volume to a target volume of the stack 112 expected to be in the measurement region 242 at this stage of the production process. The part specification 236 can specify the target volume for each stage of the production process.

The controller 217 then decides, based on the comparison of the measured volume to the target volume, whether to adjust at least one parameter of the part specification 236 for cutting the next layer in the sequence. For instance, the controller 217 can determine whether a difference between the measured volume and the target volume is greater than a threshold amount and, if so, then the controller 217 can decide to adjust the parameter(s). If the controller 217 decides to adjust the parameter(s), then the controller 217 can adjust at least one parameter of the part specification 236 for cutting the next layer.

For instance, if the measured volume is less than the target volume, the controller 217 can adjust the parameter(s) of the part specification 236 by increasing the target width at one or more locations for the next layer in the part specification 236. Similarly, if the measured volume is greater than the target volume, the controller 217 can adjust the parameter(s) of the part specification 236 by decreasing the target width at one or more locations for the next layer in the part specification 236. Thus, when the production process proceeds with cutting the next layer, the cutting device 218 will be programmed to follow an adjusted cutting path through the material to mitigate the risk of the composite part 100 having an unacceptable volume upon completion of the production process.

In additional or alternative examples, adjusting the production process includes adding additional material to a layer 110 in the stack 112 and/or removing and cutting a replacement layer 110 before cutting the next layer in the sequence to mitigate the risk of the composite part 100 having an unacceptable volume.

After all the layers 110 have been cut and positioned in the stack 112, the curing device 228 cures the layers 110. For example, the curing device 228 can apply heat and/or pressure to cure the stack of layers into the final composite part 100 having dimensions and properties in accordance with the design of the part specification 236.

Figure 6:
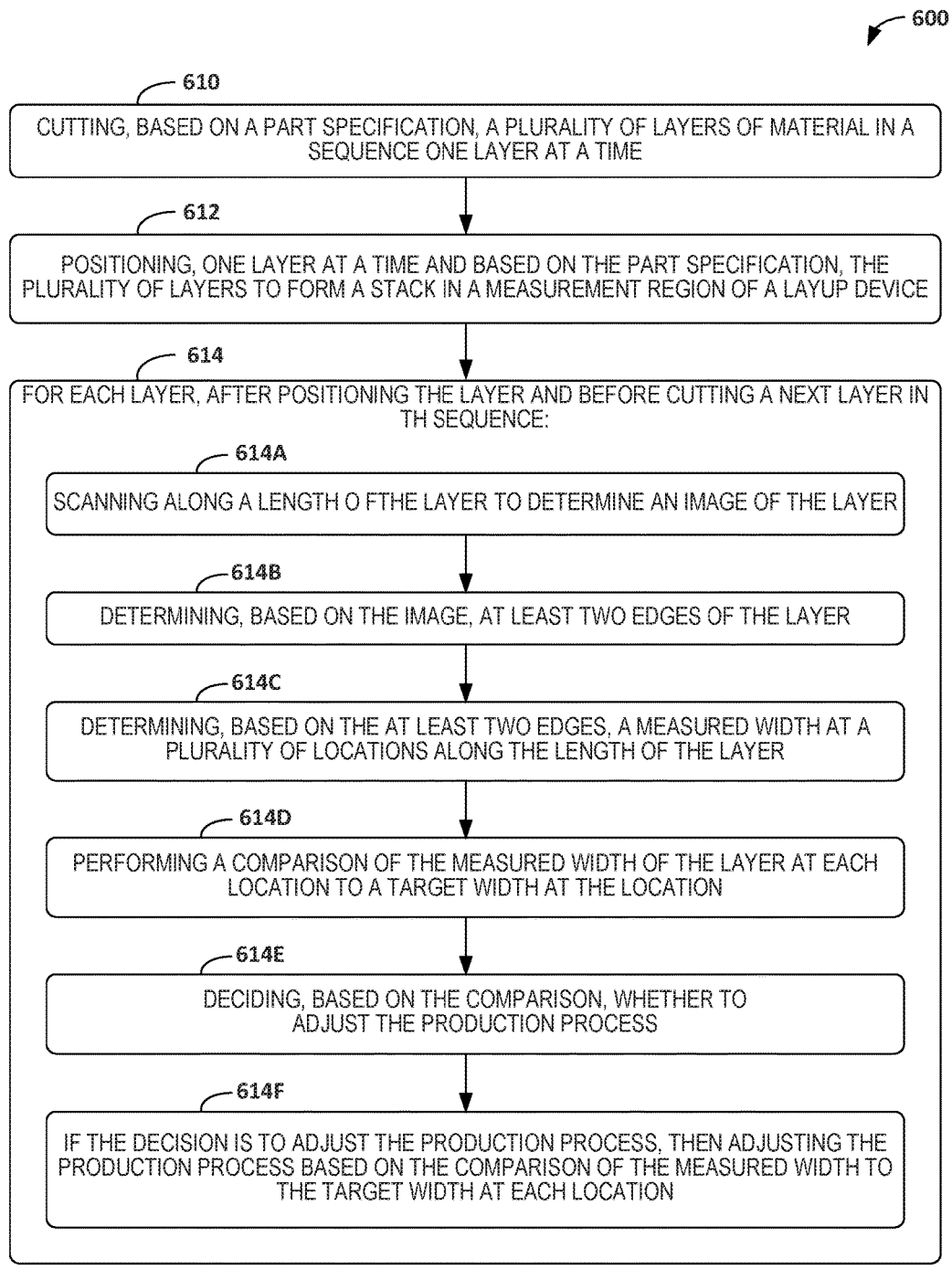
FIG. 6 depicts a flow chart of an example process for forming a composite part, according to an example embodiment.

Referring now to FIG. 6, a flow chart for a process 600 for forming a composite part is depicted according to an example embodiment. At block 610, the process 600 includes cutting, based on a part specification, a plurality of layers of material in a sequence one layer at a time. The part specification specifies parameters for a production process for forming the composite part. At block 612, the process 600 includes positioning, one layer at a time and based on the part specification, the plurality of layers to form a stack in a measurement region of a layup device.

At block 614, the process 600 includes, for each layer, after positioning the layer and before cutting a next layer in the sequence, performing a plurality of steps including blocks 614A-614F. As shown at block 614A, the steps include scanning along a length of the layer to determine an image of the layer. At block 614B, the steps include determining, based on the image, at least two edges of the layer. At block 614C, the steps include determining, based on the at least two edges, a measured width at a plurality of locations along the length of the layer. At block 614D, the steps include performing a comparison of the measured width of the layer at each location to a target width at the location. The parameters specified by the part specification include the target width at each location along the length of layer.

At block 614E, the steps include deciding, based on the comparison, whether to adjust the production process. At block 614F, if the decision is to adjust the production process at block 614E, then the steps include adjusting the production process based on the comparison of the measured width to the target width at each location. For at least one layer, the decision at block 614E is to adjust the production process.

Figure 7:
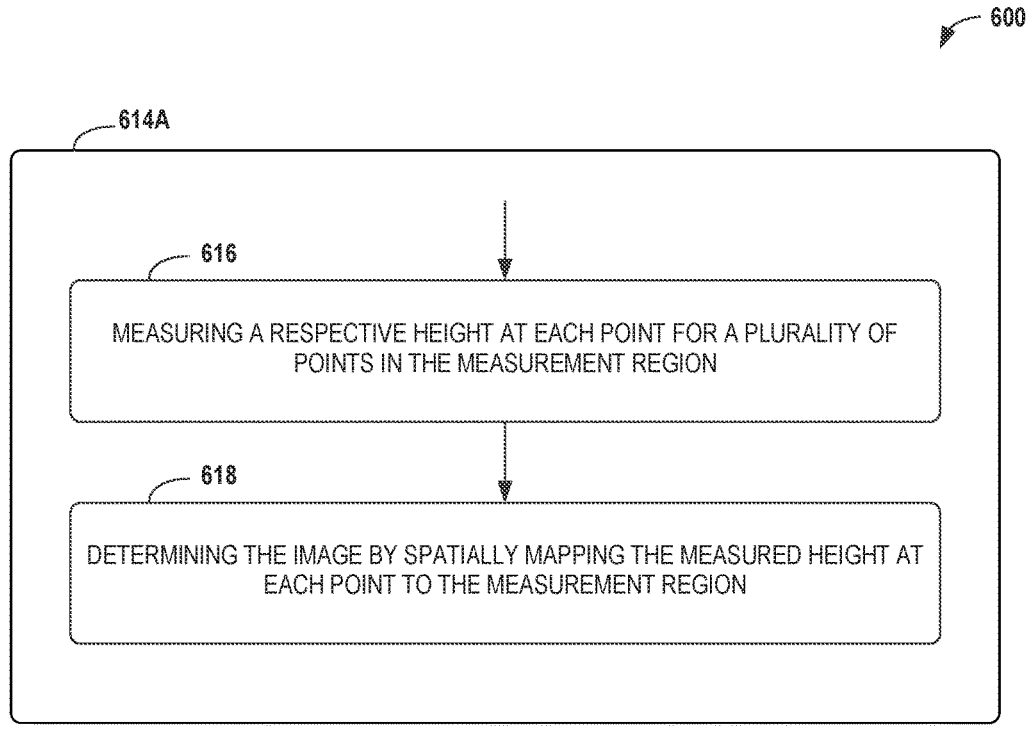
FIG. 7 depicts a flow chart of an example process for forming a composite part, according to an example embodiment.
Figure 8:
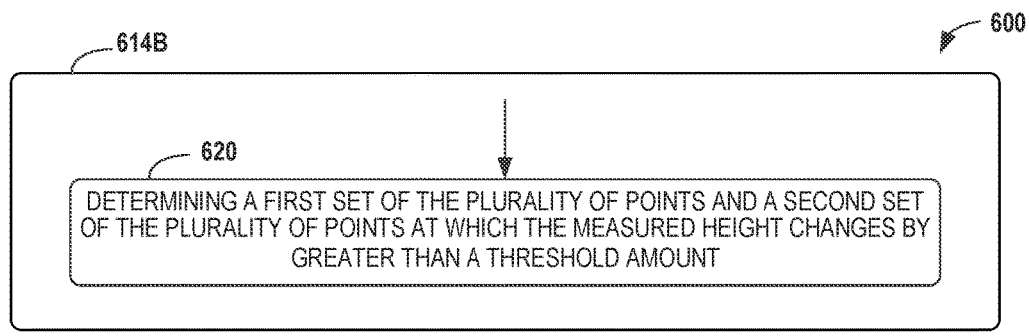
FIG. 8 depicts a flow chart of an example process for forming a composite part, according to an example embodiment.

FIGS. 7-18 depict additional aspects of the process 600 according to further examples. As shown in FIG. 7, scanning along the length of the layer to determine the image at block 614A can include measuring a respective height at each point for a plurality of points in the measurement region at block 616, and determining the image by spatially mapping the measured height at each point to the measurement region at block 618. As shown in FIG. 8, detecting the at least two edges at block 614B can include determining a first set of the plurality of points and a second set of the plurality of points at which the measured height changes by greater than a threshold amount at block 720.

Figure 9:
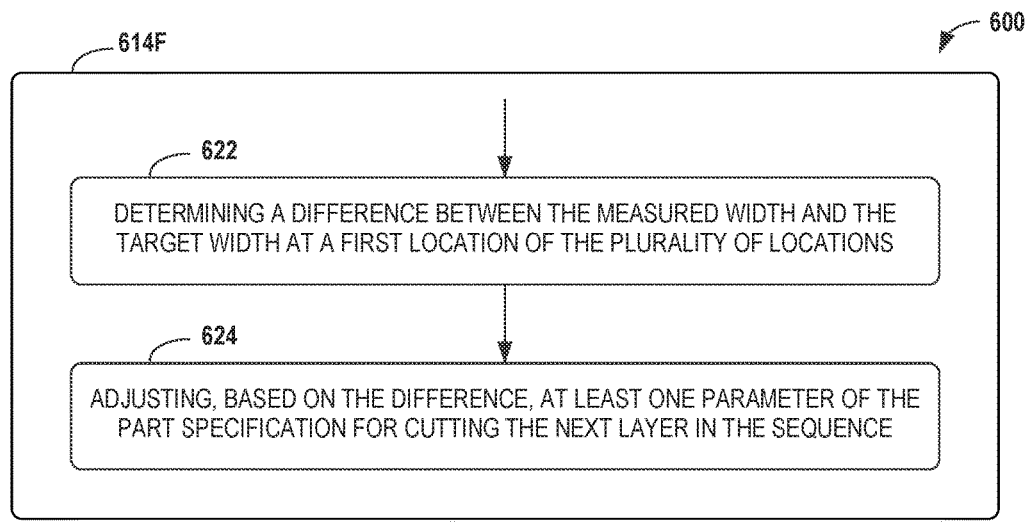
FIG. 9 depicts a flow chart of an example process for forming a composite part, according to an example embodiment.

As shown in FIG. 9, adjusting the production process at block 614F includes determining a difference between the measured width and the target width at a first location of the plurality of locations at block 622, and adjusting, based on the difference, at least one parameter of the part specification for cutting the next layer in the sequence at block 624.

Figure 10:
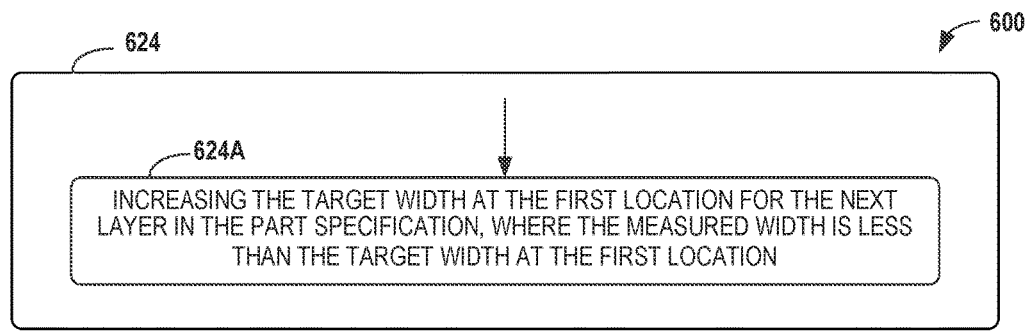
FIG. 10 depicts a flow chart of an example process for forming a composite part, according to an example embodiment.
Figure 11:
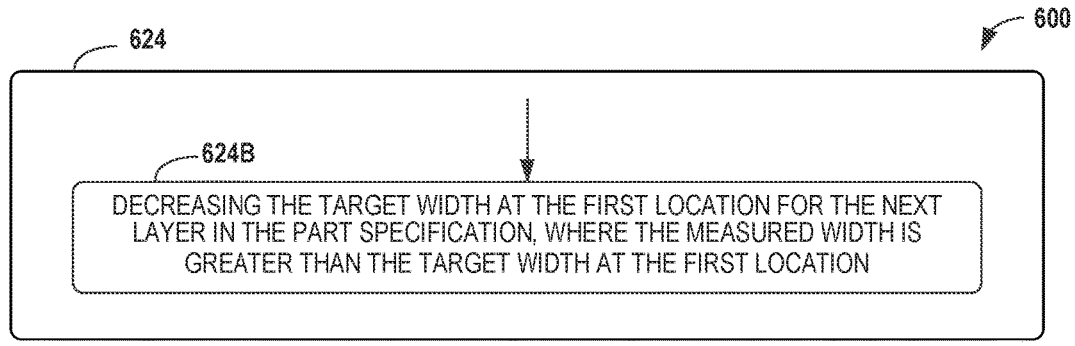
FIG. 11 depicts a flow chart of an example process for forming a composite part, according to an example embodiment.

As shown in FIG. 10, adjusting the at least one parameter of the part specification at block 624 can include increasing the target width at the first location for the next layer in the part specification at block 624A, where the measured width is less than the target width at the first location. As shown in FIG. 11, adjusting the at least one parameter of the part specification at block 624 can include decreasing the target width at the first location for the next layer in the part specification at block 624B, where the measured width is greater than the target width at the first location.

Figure 12:
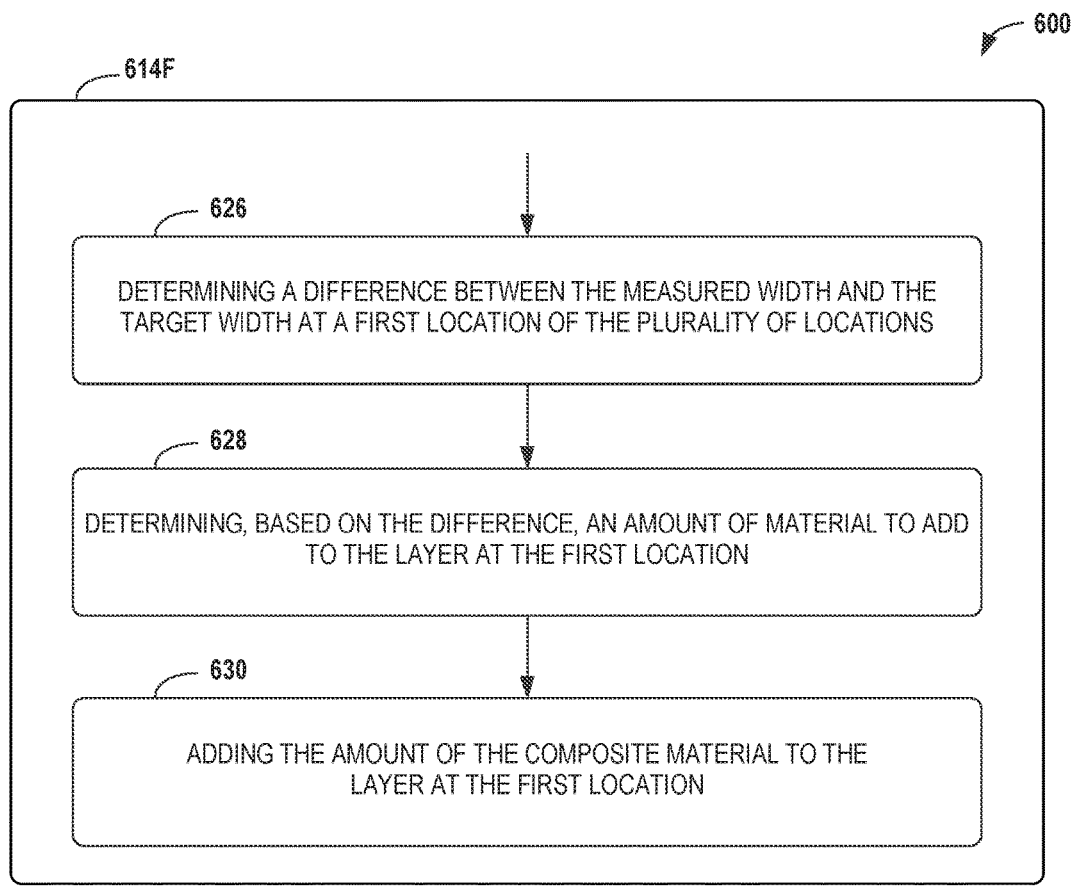
FIG. 12 depicts a flow chart of an example process for forming a composite part, according to an example embodiment.

As shown in FIG. 12, adjusting the production process at block 614F includes determining a difference between the measured width and the target width at a first location of the plurality of locations at block 626, determining, based on the difference, an amount of the material to add to the layer at the first location at block 628, and adding the amount of material to the layer at the first location at block 630.

Figure 13:
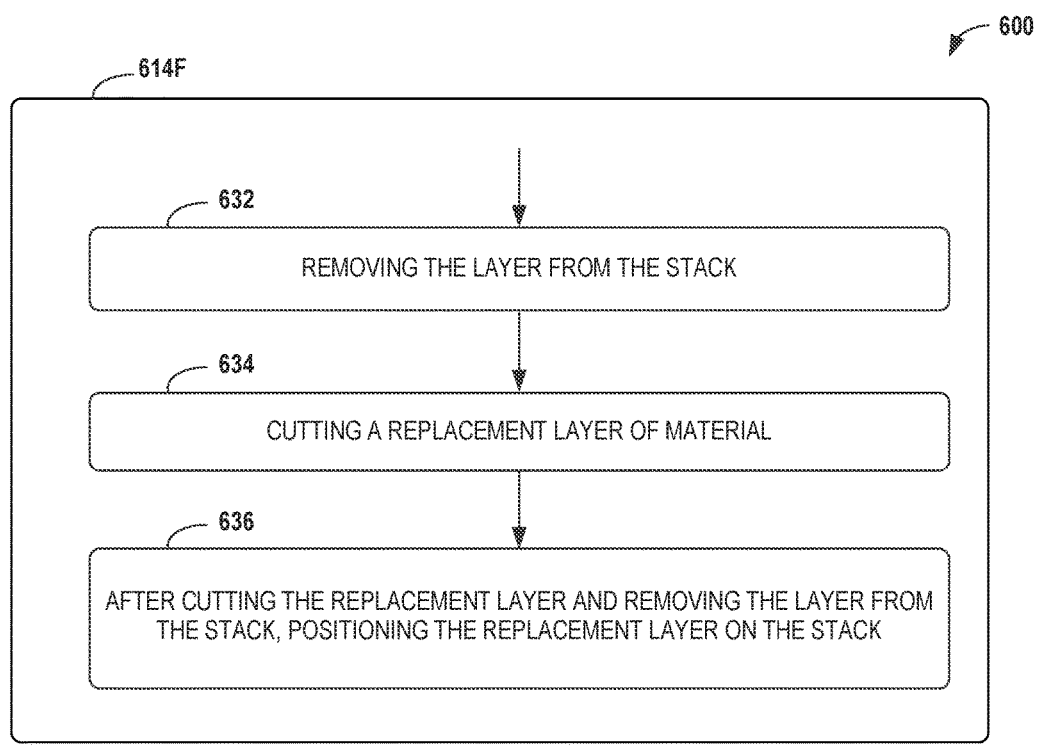
FIG. 13 depicts a flow chart of an example process for forming a composite part, according to an example embodiment.

As shown in FIG. 13, adjusting the production process at block 614F includes removing the layer from the stack at block 632, cutting a replacement layer of the material at block 634, and after cutting the replacement layer at block 632 and removing the layer from the stack at block 634, positioning the replacement layer on the stack at block 636.

Figure 14:
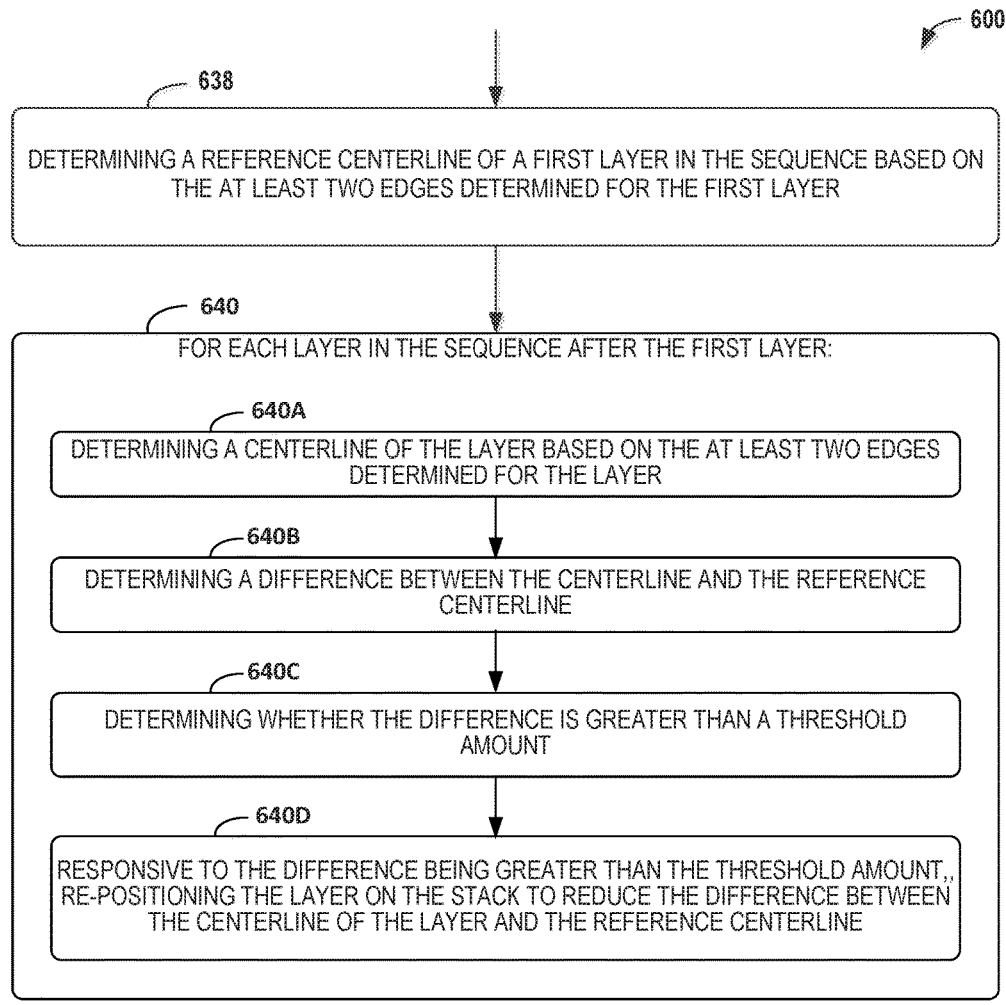
FIG. 14 depicts a flow chart of an example process for forming a composite part, according to an example embodiment.

As shown in FIG. 14, the process 600 can also include determining, at block 638, a reference centerline of a first layer in the sequence based on the at least two edges determined for the first layer at block 614C. At block 640, the process 600 further includes, for each layer in the sequence after the first layer, performing a plurality of steps shown in blocks 640A-640D. At block 640A, the steps include determining a centerline of the layer based on the at least two edges determined for the layer. At block 640B, the steps include determining a difference between the centerline of the layer and the reference centerline. At block 640C, the steps include determining whether the difference is greater than a threshold amount. At block 640D, responsive to the difference being greater than the threshold amount, the steps include re-positioning the layer on the stack to reduce the difference between the centerline of the layer and the reference centerline.

Figure 15:
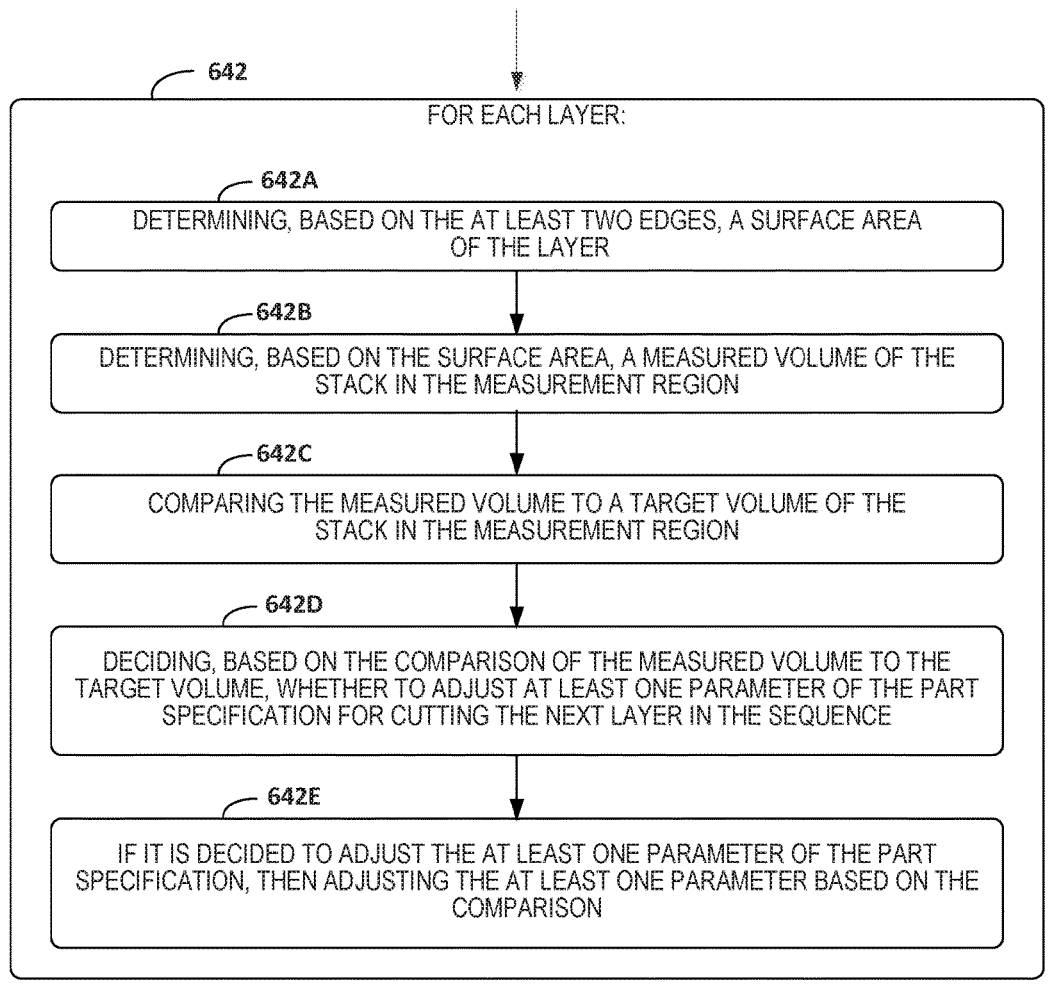
FIG. 15 depicts a flow chart of an example process for forming a composite part, according to an example embodiment.

As shown in FIG. 15, at block 642, the process 600 can also include, for each layer, performing a series of steps shown in blocks 642A-642E. At block 642A, the process 600 includes determining, based on the at least two edges, a surface area of the layer. At block 642B, the process 600 includes determining, based on the surface area, a measured volume of the stack in the measurement region. At block 642C, the process 600 includes comparing the measured volume to a target volume of the stack in the measurement region. The part specification specifies the target volume. At block 642D, the process 600 includes deciding, based on the comparison of the measured volume to the target volume, whether to adjust at least one parameter of the part specification for cutting the next layer in the sequence. At block 642E, if it is decided at block 642D to adjust the at least one parameter of the part specification, then the process includes adjusting the at least one parameter based on the comparison. For at least one layer, the decision based on the comparison of the measured volume to the target volume at block 642D is to adjust the at least one parameter.

Figure 16:
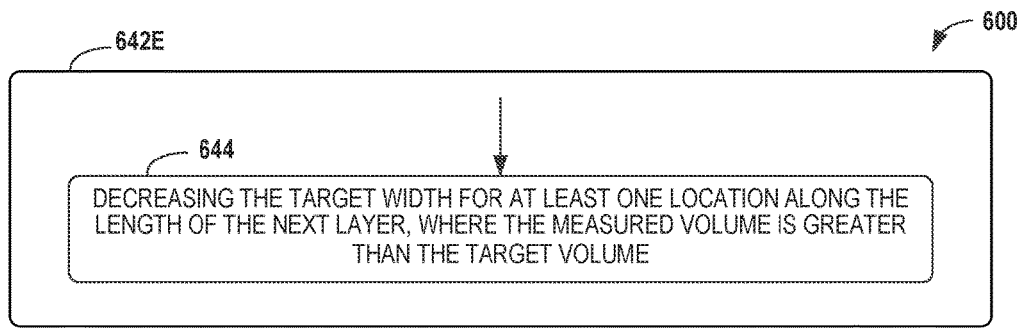
FIG. 16 depicts a flow chart of an example process for forming a composite part, according to an example embodiment.
Figure 17:
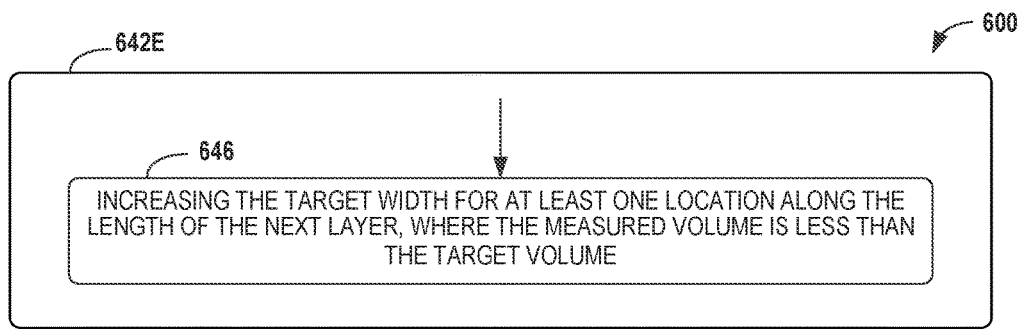
FIG. 17 depicts a flow chart of an example process for forming a composite part, according to an example embodiment.

As shown in FIG. 16, adjusting the at least one parameter of the part specification for cutting the next layer at block 642E includes decreasing the target width for at least one location along the length of the next layer at block 644, where the measured volume is greater than the target volume. As shown in FIG. 17, adjusting the at least one parameter of the part specification for cutting the next layer at block 642E includes increasing the target width for at least one location along the length of the next layer at block 646, where the measured volume is less than the target volume.

Figure 18:
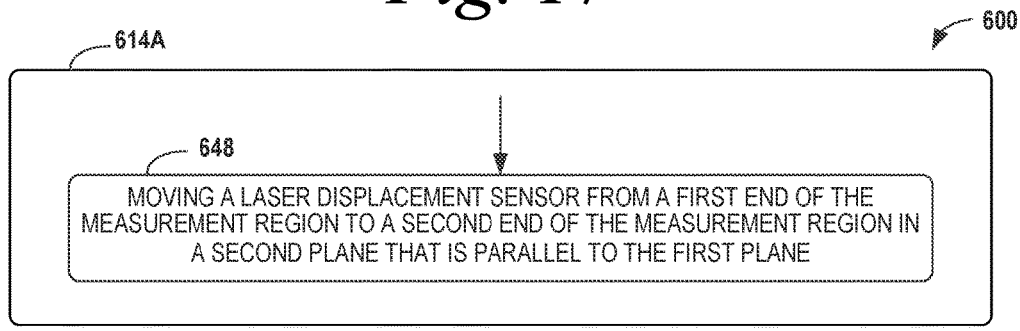
FIG. 18 depicts a flow chart of an example process for forming a composite part, according to an example embodiment.

As shown in FIG. 18, scanning along the length of the layer at block 614A can include, at block 648, moving a laser displacement sensor from a first end of the measurement region to a second end of the measurement region in a second plane that is parallel to a first plane. The stack is positioned on a flat surface extending in the first plane of the measurement region, and the first plane is at a fixed distance from the second plane.

V. Example Variations

In the example depicted in FIGS. 3A-3B, the layup surface 240 is a flat surface; however, in another example, the layup surface 240 can be a surface on a mandrel having a three-dimensional shape. Additionally, in the examples depicted in FIGS. 1A-1C and FIGS. 3A-3B, the layers have a substantially rectangular shape; however, in additional or alternative examples, the layers can have different shapes and sizes.

By the terms "substantially" or "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Example aspects have been described above. After studying the configurations, examples, and arrangements described herein a skilled person may come to understand, however, that changes and modifications may be made without departing from the true scope and spirit of the disclosure. The description of the different advantageous aspects has been presented for purposes of illustration and description, and is not intended to be exhaustive or limited to the form disclosed. After reviewing this disclosure, many modifications and variations will become apparent to those of ordinary skill in the art. Further, different advantageous aspects may provide different advantages as compared to other advantageous aspects. The example aspects selected are chosen and described in order to explain the principles of the disclosure, the practical application, and to enable others of ordinary skill in the art to understand the disclosure with various modifications as are suited to the particular use contemplated.

What is claimed is:

1. A method for forming a composite part, comprising:
cutting, based on a part specification, a plurality of layers of material in a sequence one layer at a time, wherein the composite part is formed from the plurality of layers, and wherein the part specification specifies parameters for a production process for forming the composite part;
positioning, one layer at a time and based on the part specification, the plurality of layers to form a stack in a measurement region of a layup device;
for each layer, after positioning the layer and before cutting a next layer in the sequence:
scanning along a length of the layer to determine an image of the layer;
determining, based on the image, at least two edges of the layer;
determining, based on the at least two edges, a surface area of the layer;
determining, based on the surface area and a known thickness of the layer, a measured volume of the stack in the measurement region;
performing a comparison of the measured volume to a target volume of the stack in the measurement region corresponding to the layer and previously positioned layers, wherein the part specification specifies the target volume;
deciding, based on the comparison of the measured volume to the target volume, whether to adjust the production process; and
if the decision is to adjust the production process, then adjusting the production process based on the comparison of the measured volume to the target volume, wherein, for at least one layer, the decision is to adjust the production process.

2. The method of claim 1, wherein scanning along the length of the layer to determine the image comprises:
measuring a respective height at each point for a plurality of points in the measurement region; and
determining the image by spatially mapping the measured height at each point to the measurement region.

3. The method of claim 2, wherein determining the at least two edges comprises determining a first set of the plurality of points and a second set of the plurality of points at which the measured height changes by greater than a threshold amount.

4. The method of claim 1, wherein adjusting the production process comprises:
determining, based on the at least two edges, a measured width at a plurality of locations along the length of the layer;
determining a difference between the measured width and a target width at a first location of the plurality of locations;
determining, based on the difference, an amount of the material to add to the layer at the first location; and
adding the amount of the material to the layer at the first location.

5. The method of claim 1, wherein adjusting the production process comprises:
removing the layer from the stack;
cutting a replacement layer of the material; and after cutting the replacement layer and removing the layer from the stack, positioning the replacement layer on the stack.

6. The method of claim 1, further comprising:
determining a reference centerline of a first layer in the sequence based on the at least two edges determined for the first layer;
for each layer in the sequence after the first layer:
determining a centerline of the layer based on the at least two edges determined for the layer;
determining a difference between the centerline of the layer and the reference centerline;
determining whether the difference is greater than a threshold amount; and
responsive to the difference being greater than the threshold amount, re-positioning the layer on the stack to reduce the difference between the centerline of the layer and the reference centerline.

7. The method of claim 1,
wherein deciding, based on the comparison of the measured volume to the target volume, whether to adjust the production process comprises deciding, based on the comparison of the measured volume to the target volume, whether to adjust at least one parameter of the part specification for cutting the next layer in the sequence; and
wherein adjusting the production process based on the comparison of the measured volume to the target volume comprises adjusting the at least one parameter based on the comparison.

8. The method of claim 7, wherein the measured volume is greater than the target volume, and
wherein adjusting the at least one parameter of the part specification for cutting the next layer comprises decreasing a target width for at least one location along the length of the next layer.

9. The method of claim 7, wherein the measured volume is less than the target volume, and
wherein adjusting the at least one parameter of the part specification for cutting the next layer comprises increasing a target width for at least one location along the length of the next layer.

10. The method of claim 1, wherein the stack is positioned on a flat surface extending in a first plane of the measurement region,
wherein scanning along the length of the layer comprises moving a laser displacement sensor from a first end of the measurement region to a second end of the measurement region in a second plane that is parallel to the first plane, and
wherein the first plane is at a fixed distance from the second plane.

11. The method of claim 1, further comprising:
determining, based on the comparison of the measured volume to the target volume, whether a difference between the measured volume and the target volume is greater than a threshold amount,
wherein deciding whether to adjust the production process comprises deciding whether to adjust at least one parameter of the part specification for cutting the next layer in the sequence based on determining that the difference between the measured volume and the target volume is greater than the threshold amount.

12. The method of claim 1, wherein adjusting the production process comprises:
changing a target width at one or more locations for the next layer in the part specification; and
when the production process proceeds with cutting the next layer, following an adjusted cutting path through the material.

13. A system for forming a composite part, comprising:
a cutting device to cut, one layer at a time, a plurality of layers of material, wherein the composite part is formed from the plurality of layers;
a measurement region to receive the plurality of layers, one layer at a time, to form a stack;
a measurement device to scan the measurement region; and
a controller configured to:
cause the cutting device to cut, based on a part specification, the plurality of layers one layer at a time in a sequence, wherein the part specification specifies parameters for a production process for forming the composite part, and
for each layer, after receiving the layer in the measurement region and before causing the cutting device to cut a next layer in the sequence:
cause the measurement device to scan along a length of the layer to determine an image of the layer;
determine, based on the image, at least two edges of the layer;
determine, based on the at least two edges, a surface area of the layer;
determine, based on the surface area and a known thickness of the layer, a measured volume of the stack in the measurement region;
perform a comparison of the measured volume to a target volume of the stack in the measurement region corresponding to the layer and previously positioned layers, wherein the part specification specifies the target volume;
decide, based on the comparison of the measured volume to the target volume, whether to adjust the production process; and
if the decision is to adjust the production process, then adjust the production process based on the comparison of the measured volume to the target volume,
wherein, for at least one layer, the decision is to adjust the production process.

14. The system of claim 13, wherein the measurement device is a laser displacement sensor.

15. The system of claim 13, wherein the controller is further configured to:
determine a reference centerline of a first layer in the sequence based on the at least two edges determined for the first layer;
for each layer in the sequence after the first layer:
determine a centerline of the layer based on the at least two edges determined for the layer;
determine a difference between the centerline of the layer and the reference centerline;
determine whether the difference is greater than a threshold amount; and
responsive to the difference being greater than the threshold amount, re-position the layer on the stack to reduce the difference between the centerline of the layer and the reference centerline.

16. The system of claim 13,
wherein deciding, based on the comparison of the measured volume to the target volume, whether to adjust the production process comprises deciding, based on the comparison of the measured volume to the target volume, whether to adjust at least one parameter of the part specification for cutting the next layer in the sequence; and wherein adjusting the production process based on the comparison of the measured volume to the target volume comprises adjusting the at least one parameter based on the comparison.

17. A non-transitory computer readable medium having stored thereon, program instructions that when executed by a controller, cause a composite part production system to perform a set of acts, wherein the composite part production system includes a cutting device for cutting a plurality of layers of material, a measurement region for receiving the plurality of layers to form a stack, and a measurement device for scanning the measurement region, the set of acts comprising:

cutting, by the cutting device and based on a part specification, a plurality of layers one layer at a time in a sequence, wherein the composite part is formed from the plurality of layers, and wherein the part specification specifies parameters for a production process for forming the composite part;

positioning, one layer at a time and based on the part specification, the plurality of layers to form the stack in the measurement region; and for each layer, after positioning the layer and before cutting a next layer in the sequence:

scanning, by the measurement device, along a length of the layer to determine an image of the layer;

determining, based on the image, at least two edges of the layer;

determining, based on the at least two edges, a surface area of the layer;

determining, based on the surface area and a known thickness of the layer, a measured volume of the stack in the measurement region;

performing a comparison of the measured volume to a target volume of the stack in the measurement region corresponding to the layer and previously positioned layers, wherein the part specification specifies the target volume;

deciding, based on the comparison of the measured volume to the target volume, whether to adjust the production process; and if the decision is to adjust the production process, then adjusting the production process based on the comparison of the measured volume to the target volume, wherein, for at least one layer, the decision is to adjust the production process.

18. The non-transitory computer readable medium of claim 17, wherein the set of acts further comprise:

determining a reference centerline of a first layer in the sequence based on the at least two edges determined for the first layer;

for each layer in the sequence after the first layer:

determining a centerline of the layer based on the at least two edges determined for the layer;

determining a difference between the centerline of the layer and the reference centerline;

determining whether the difference is greater than a threshold amount; and responsive to the difference being greater than the threshold amount, re-positioning the layer on the stack to reduce the difference between the centerline of the layer and the reference centerline.

19. The non-transitory computer readable medium of claim 17, wherein the set of acts further comprise:

for each layer:

deciding, based on the comparison of the measured volume to the target volume, whether to adjust at least one parameter of the part specification for cutting the next layer in the sequence; and if it is decided to adjust the at least one parameter of the part specification, then adjusting the at least one parameter based on the comparison, wherein, for at least one layer, the decision based on the comparison of the measured volume to the target volume is to adjust the at least one parameter of the part specification.

* * * * *